United States Patent
Korkama et al.

(10) Patent No.: US 10,906,359 B2
(45) Date of Patent: Feb. 2, 2021

(54) PNEUMATIC TIRE, A TREAD BAND, AND A TREAD BLOCK COMPRISING A SIPE, AND A LAMELLA PLATE FOR THE MANUFACTURE THEREOF

(71) Applicant: NOKIAN RENKAAT OYJ, Nokia (FI)

(72) Inventors: Tomi Korkama, Tampere (FI); Niko Haanketo, Nokia (FI)

(73) Assignee: NOKIAN RENKAAT OYJ, Nokia (FI)

( * ) Notice: Subject to any disclaimer, the term of this patent is extended or adjusted under 35 U.S.C. 154(b) by 351 days.

(21) Appl. No.: 15/842,319

(22) Filed: Dec. 14, 2017

(65) Prior Publication Data

US 2018/0170115 A1 Jun. 21, 2018

(30) Foreign Application Priority Data

Dec. 19, 2016 (EP) .................................. 16397539

(51) Int. Cl.
*B60C 11/12* (2006.01)
*B29D 30/06* (2006.01)
*B60C 11/03* (2006.01)

(52) U.S. Cl.
CPC ...... *B60C 11/1218* (2013.01); *B29D 30/0606* (2013.01); *B60C 11/12* (2013.01);
(Continued)

(58) Field of Classification Search
CPC ............. B60C 11/1218; B60C 11/1204; B60C 11/1222; B60C 11/1263; B60C 11/1281; B60C 11/1227; B60C 11/1231
See application file for complete search history.

(56) References Cited

U.S. PATENT DOCUMENTS 6,427,737 B1    8/2002  Katayama
6,554,034 B1 *  4/2003  Minami .............. B60C 11/0306
                                                152/209.22
(Continued)

FOREIGN PATENT DOCUMENTS

DE    102014203546 A1    8/2015
EP      0 952 011 A2    10/1999
(Continued)

OTHER PUBLICATIONS

European Search Report, dated May 31, 2017, from corresponding EP application No. 16 39 7539.
(Continued)

*Primary Examiner* — Jacob T Minskey
*Assistant Examiner* — Virak Nguon
(74) *Attorney, Agent, or Firm* — Nixon & Vanderhye

(57) ABSTRACT

A pneumatic tire is provided with sipes, at least some of which have an open top end to the surface of the tread block. An intersection of the sipe with a surface that is geometrically congruent and parallel with the surface of the tread block and arranged a depth apart from the surface of the tread block into the tread block forms a curved line. A first sipe is shaped in such a way, that at all depths (d) within a range from the open top of the first sipe to a first transition depth, the curved line includes at least one deflection point having an inner corner that has a radius of curvature under 0.3 mm. A lamella plate for manufacturing the pneumatic tire, the tread band, or the tread block. Use of the lamella plate for manufacturing a tread block, a tread band, or a pneumatic tire.

17 Claims, 9 Drawing Sheets

(52) U.S. Cl.
CPC ...... *B60C 11/1204* (2013.01); *B60C 11/1222* (2013.01); *B60C 11/1263* (2013.01); *B60C 11/1281* (2013.01); *B29D 2030/0609* (2013.01); *B29D 2030/0613* (2013.01); *B60C 11/0306* (2013.01); *B60C 2011/1213* (2013.01)

(56) References Cited

U.S. PATENT DOCUMENTS

| | | | |
|---|---|---|---|
| 7,516,767 B2 | 4/2009 | Tsubono et al. | |
| 2002/0139164 A1* | 10/2002 | Ishihara | B21D 37/20 |
| | | | 72/326 |
| 2005/0109438 A1* | 5/2005 | Collette | B60C 11/12 |
| | | | 152/209.18 |
| 2006/0118221 A1* | 6/2006 | Tsubono | B60C 11/12 |
| | | | 152/209.18 |
| 2007/0272337 A1* | 11/2007 | Bovaird | B60C 11/12 |
| | | | 152/209.18 |
| 2011/0226397 A1* | 9/2011 | Hamada | B60C 11/11 |
| | | | 152/209.18 |
| 2016/0052346 A1* | 2/2016 | Jang | B60C 11/01 |
| | | | 152/209.16 |

FOREIGN PATENT DOCUMENTS

| | | |
|---|---|---|
| EP | 1 223 054 A1 | 7/2002 |
| EP | 1 859 962 | 11/2007 |
| EP | 1 859 962 A1 | 11/2007 |
| EP | 1 669 218 B1 | 5/2011 |
| JP | 2002-046426 A | 2/2002 |
| WO | 2011/125293 A1 | 10/2011 |
| WO | 2014/068385 A1 | 5/2014 |
| WO | WO-2014068385 A1 * | 5/2014 ......... B60C 11/1218 |

OTHER PUBLICATIONS

European Office Action for Application No. 16 397 539.4, dated Feb. 18, 2019.

* cited by examiner

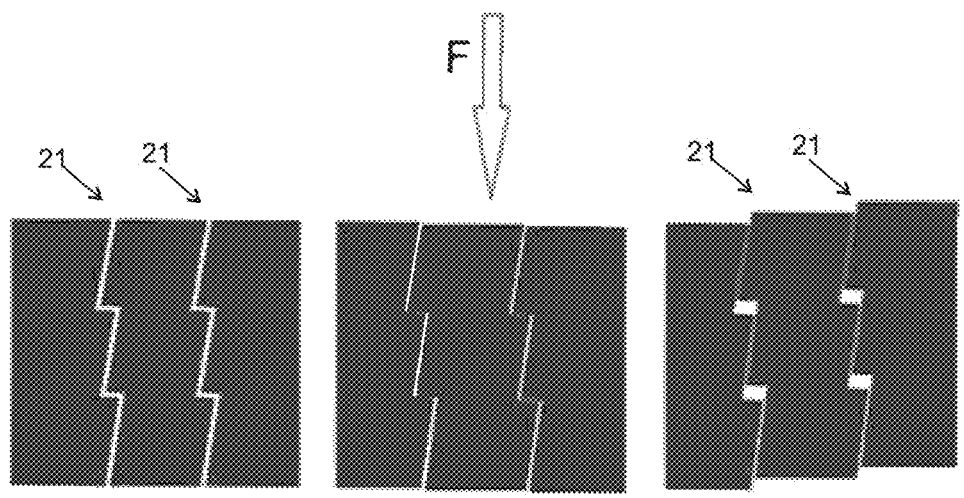
Fig. 11a1  Fig. 11a2  Fig. 11a3
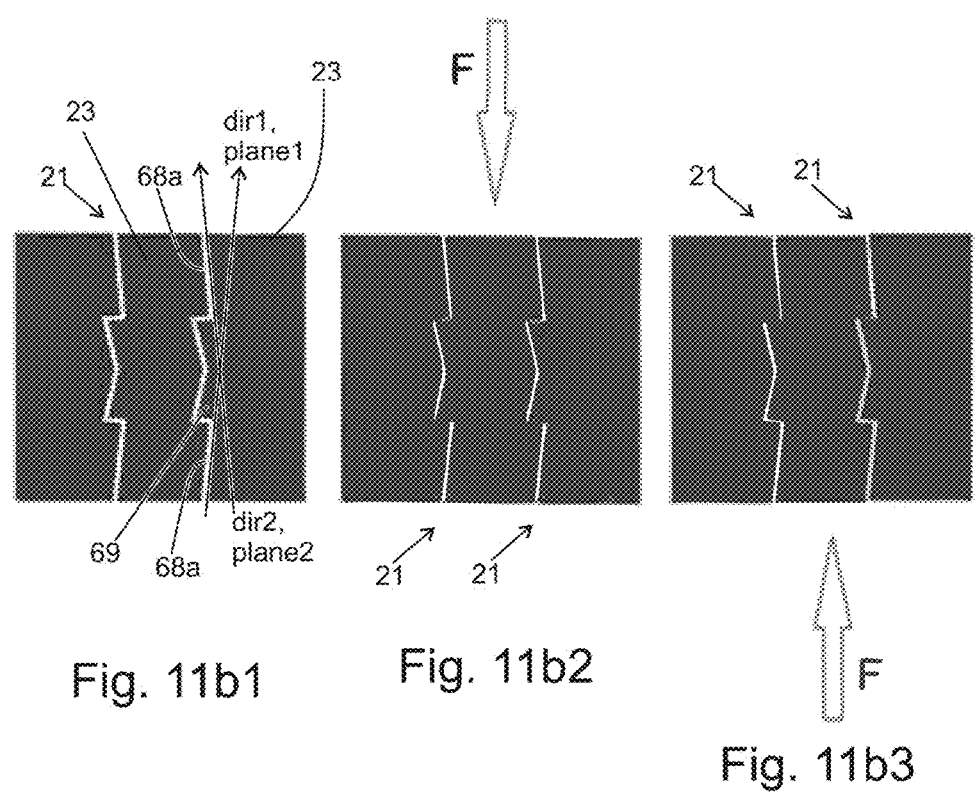
Fig. 11b1  Fig. 11b2  Fig. 11b3

PNEUMATIC TIRE, A TREAD BAND, AND A TREAD BLOCK COMPRISING A SIPE, AND A LAMELLA PLATE FOR THE MANUFACTURE THEREOF

TECHNICAL FIELD

The present application relates to a pneumatic tire or a tread band having tread blocks, and being provided in the tread blocks with sipes, more particularly to an improved shape of a sipe being capable of providing better traction of the tire. The present application also relates to a lamella plate that is used in the manufacturing process of a pneumatic tire for making said sipe. The present application also relates to the use of said lamella plate for manufacturing a tire or a tread band. The present application further relates to a method for manufacturing a lamella plate according to the application.

BACKGROUND

A tread of a known pneumatic tyre is indicated in FIG. 1. A pneumatic tire is known to include a tread band having a tread which has circumferential and transversal grooves 1 on its outer surface, said grooves defining a number of protruding parts, such as ribs, shoulders and tread blocks. The tread is meant for a rolling contact against a ground surface, such as road. The grooves 1 are meant for draining water and/or slush that is possibly located on the ground surface away from the tread, so that the contact between the tread and the ground surface is as good and consistent as possible. Certain types of tires such as winter tires are provided in the tread with a number of sipes 11 at various angles with respect to a motion direction of the tire. The sipes 11 not only serve a better tire-ground contact in the rain, but also improve traction, braking and lateral stability on snow by trapping snow as well as providing more gripping edges. The sipes also make the rubber material to deform more easily, in effect making the tire appear softer. This also improves friction.

An example of a sipe 11 in use today is shown in FIG. 1, wherein the top view of the sipe 11 shows a waved line which swings back and forth in the longitudinal direction of the sipe one or more cycles, with two or more bent points 12. In between two sipes 11, lamellas 13 are arranged. Lamella plates 33 used in the manufacturing process of a pneumatic tire for making said kinds of sipes 11 are, for example, shown in FIG. 3a and FIG. 3b. The manufacturing process of said lamella plates 33 is by bending a flat plate into a desired shape with bent points 32.

SUMMARY

An object of the application is to improve the properties of a pneumatic tire provided with lamellas and sipes in the tread block so that lamellas can work more efficiently in the sense of improved gripping, improved stability because of the more efficient locking of the lamella.

It is also an object of the application to provide a lamella plate that is able to make the sipe according to the present application, which lamella plate is easy to make so that the cost and time of manufacturing a tire can be reduced.

An embodiment of the application is a tread block 200 (see FIGS. 9 and 12a). Such a tread block 200 may be a tread block 200 of a tire 90 or a tread block of a tread band 100, which can be used to form a tread of a tire, as indicated in FIGS. 12a and 12b. A preform of a tire 92 can be coated with the tread band 100 to form the tire 90 having the tread with tread blocks 200. Such a tread block 200 is provided with sipes 21, and can be used as part of a tread band 100 or as part of a tread of a tire 90. At least some of the sipes 21 have an open top end (TOP, see FIGS. 1, 2c, 8, 10a, 12a) to the surface of the tread block 200, a bottom located in the tread block, a first side wall 26a and a second side wall 26b (see FIG. 2a) curved in the lengthwise direction of the sipe 21. The shape of a first sipe 21 of the sipes 21 defines, at each depth d of the first sipe 21, a curved line that is the intersection of the first sipe 21 with a surface (107a, 107b; see FIGS. 2a and 10b) that is geometrically congruent with the surface of the tread block 200, parallel thereto, and located the depth d apart from the open top TOP. At least the first sipe 21 of the sipes 21 of the tread block 200 is shaped in such a way, that at all depths within a range from the open top TOP of the first sipe 21 to a first transition depth d1, the curved line 210 comprises at least one deflection point 22a having an inner corner 220a, which has a radius of curvature under 0.3 mm, preferably under 0.25 mm, and more preferably from 0 to 0.2 mm. The first transition depth d1 may be e.g. at least 0.3 mm, at least 0.5 mm or at least 1.0 mm. The first transition depth d1 may be e.g. from 0.3 mm to 6 mm, from 0.5 mm to 6 mm or from 1.0 mm 6 mm.

A pneumatic tire 90 includes a tread that is meant for a rolling contact against a ground surface, said tread having a cylindrical shape 971 (FIG. 9) with a first radius r1, the tread comprising tread blocks 200 provided with sipes 21, at least some of the sipes having an open top end (TOP, FIG. 1, 2c, 8, 9) to the surface of the tread block, a bottom located in the tread block, a first side wall 26a and a second side wall 26b curved in the lengthwise direction of the sipe. An intersection of at least one of the sipes with a surface of a cylinder 972 that is coaxial with the tire and has a second radius r2 forms a curved line 210. Thus, the depth d at which the curved line 210 is observed, is the difference between the first radius r1 and the second radius r2. In an embodiment, the side walls 26a, 26b have surfaces geometrically congruent to each other. This improves the locking of the adjacent lamellas on the tire.

In a pneumatic tire 90 according to an embodiment of the application, at least a first sipe 21 of the sipes 21 is shaped in such a way, that at all depths within a range from the open top TOP of the first sipe 21 to a first transition depth d1, the curved line 210 comprises at least one deflection point 22a having an inner corner 220a that has a radius of curvature under 0.3 mm, preferably under 0.25 mm, and more preferably from 0 to 0.2 mm. The first transition depth d1 may be at least 0.3 mm, e.g. at least 0.5 mm, or at least 1 mm, such as from 0.3 to 6 mm, from 0.5 to 6 mm or from 1.0 to 6 mm. In an embodiment, the at least one deflection point 22a has a deflection angle DA, which is less than 90 degrees, preferably less than 75 degrees. In one example, the deflection angle may be 90 degrees or more.

At a certain depth, greater than a second transition depth d2, the curved line 210 may comprise such bending points 22b that have an inner rounded corner 220b, of which radius of curvature is at least 0.3 mm, preferably at least 0.5 mm (see FIG. 2b). In one example, the second transition depth d2 is greater than the first transition depth d1. In one example, the second transition depth d2 is at least 0.5 mm greater than the first transition depth d1. In an embodiment, at a certain depth d greater than the second transition depth d2, the curved line 210 comprises only such bending points 22b that have an inner rounded corner 220b, of which radius of curvature is at least 0.3 mm, preferably at least 0.5 mm.

In one example of the pneumatic tire according to the application, the bottom of the first sipe 21 has an uneven or curved surface, whereby the depth measured from the surface of the tread block 200 to the bottom of the first sipe 21 at a first primary point is different from the depth measured from the surface of the tread block to the bottom of the sipe 21 at another, second primary, point. The deeper of these locations may be arranged closer to a center of the sipe than the shallower of these locations.

In one example of the pneumatic tire the first side wall 26a of a sipe 21 comprises a projection or a recession and the second side wall 26b of the sipe 21 comprises a geometrically congruent recession or projection, respectively. In this way, the first and second side walls (26a, 26b) form a locking element configured to lock the first and second side walls (26a, 26b) of the sipe to each other in use.

In one example of the pneumatic tire according to the application, the first side wall 26a of the first sipe 21 and the second side wall 26b of the first sipe 21 may comprise at least two planes (P1, P2; FIG. 8) which form an angle with each other in the depth-wise direction of the sipe in such a way that the intersection of these planes (P1, P2) extends in a direction that forms an angle of at least 15 degrees with the normal of the surface of the tread block 200. The angle between the direction and the normal of the surface of the tread block may be e.g. at least 45 degree or at least 60 degrees.

In one example of the pneumatic tire according to the application, the first side wall 26a of the first sipe 21 and the second side wall 26b of the first sipe 21 may comprise at least two planes (P1, P2) which form an angle with each other in the depth-wise direction of the sipe in such a way that the intersection of these planes (P1, P2) extends in a direction of the surface of the tread of the tire.

In one example of the pneumatic tire according to the application, the first side wall 26a of the first sipe 21 and the second side wall 26b of the first sipe 21 may be configured in such a way that at a given depth d
- at a first secondary point 68a (FIG. 6), the curved line 210 propagates in a first direction, the first secondary point 68a defining a first tangential plane having the first secondary point, the first direction and the direction of the depth,
- at a second secondary point 68b, the curved line 210 propagates in a second direction that is parallel to the first direction or forms an angle of at most 30 degrees with the first direction, the second secondary point defining a second tangential plane having the second secondary point, the second direction and the direction of the depth, and
- the first or the second side wall comprises a protrusion 69 in between the first secondary point and the second secondary point, wherein the protrusion protrudes to the same direction from the first tangential plane and the second tangential plane.

In yet one example of the pneumatic tire according to the application, in the first sipe 21,
the curved line 210 comprises at least three deflection points in between the first secondary point 68a and the second secondary point 68b;
preferably
the curved line 210 comprises at least four deflection points in between the first secondary point 68a and the second secondary point 68b;
more preferably
the curved line 210 comprises at least four deflection points in between the first secondary point 68a and the second secondary point 68b and
at least one of the deflection points has a deflection angle of less than 85 degrees.

In an embodiment, the maximum depth of the first sipe is from 4 mm to 10 mm. In an embodiment, the minimum depth of the first sipe is from 1 mm to 3 mm. In an embodiment, the depth increases continuously from zero to the maximum depth. In an embodiment, the maximum width of the first sipe is at most 3 mm or at most 2 mm; such as from 0.2 mm 3 mm or from 0.2 mm to 2 mm. In an embodiment, the length of the first sipe is from 4 mm to 10 cm, such as from 1 cm to 10 cm. As is evident, the tire may comprise also other sipes, of which length, width, and depth may vary according to the tread pattern. For example, FIGS. 1a and 10a indicate sipes having different lengths.

The tire 90 can be seen as a tire comprising the aforementioned tread block 200. What has been said about the sipes of the tire 90 applies to the sipes of the tread block 200. The tire 90 can be seen as a tire comprising the aforementioned tread band 100. What has been said about the sipes of the tire 90 applies to the sipes of the tread band 100.

A tire 90 can be made e.g. in a tire mould having lamella plates for forming the first sipe 21 and the other sipes 21.

In the alternative, a tread of a tire 90 can be made by applying a tread band 100 onto a preform of a tire 92 (see FIGS. 12a and 12b). The tread band 100 can be sold e.g. as a planar object, optionally in roll-form. In a tread band 100 according to an embodiment of the application, said tread band including a tread that is meant for a rolling contact against a ground surface, at least a first sipe of the sipes 21 is shaped in such a way, that at all depths within a range from the open top TOP of the first sipe to a first transition depth d1, the curved line 210 comprises at least one deflection point 22a having an inner corner 220a, which has a radius of curvature under 0.3 mm, preferably under 0.25 mm, and more preferably from 0 to 0.2 mm. As for the values of the first transition depth d1, the aforementioned values apply. Here the curved line 210 refers to the cross-section of the first sipe 21 with a surface (107a, 107b) that is geometrically congruent with the surface of the tread band 100, parallel thereto, and located a depth d apart from the open top TOP. Moreover, the depth is the distance between the open top end TOP of the first sipe 21 and the intersection of the sipe with a surface that is geometrically congruent with the surface of the tread band 100.

In an embodiment, at a certain depth, greater than a second transition depth d2, the curved line 210 comprises such bending points 22b that have an inner rounded corner 220b, of which radius of curvature is at least 0.3 mm, preferably at least 0.5 mm. In one example, the second transition depth d2 is greater than the first transition depth d1. In one example, the second transition depth d2 is at least 0.5 mm greater than the first transition depth d1. In one example, at a depth greater than the second transition depth d2, the curved line 210 comprises only such bending points 22b that have an inner rounded corner 220b, of which radius of curvature is at least 0.3 mm, preferably at least 0.5 mm. The at least one deflection point 22a has a deflection angle DA, which is less than 90 degrees, preferably less than 85 degrees or less than 75 degrees. In one example, the deflection angle may be 90 degrees or more.

In an embodiment, the side walls 26a, 26b of the sipe of the tread band 100 are geometrically congruent to each other. This improves the locking of the adjacent lamellas on the tire.

In one example of the tread band 100 according to the application, the bottom of the first sipe may have an uneven or curved surface, whereby the depth measured from the surface of the tread block to the bottom of the first sipe at a first primary point is different from the depth measured from the surface of the tread block to the bottom of the sipe at a second primary point.

In one example of the tread band 100 according to the application, in the first sipe, the first side wall 26a and the second side wall 26b may comprise at least two planes which form an angle with each other in the depth-wise direction of the sipe in such a way that the intersection of these planes extends in a direction of the surface of the tread block 200.

In one example of the tread band 100 according to the application, in the first sipe, the first side wall and the second side wall may be configured in such a way that for a given depth at a first secondary point, the curved line 210 propagates in a first direction, the first secondary point defining a first tangential plane having the first secondary point, the first direction, and the direction of the depth, at a second secondary point, the curved line 210 propagates in a second direction, that is parallel to the first direction or forms an angle of at most 30 degrees with the first direction, the second secondary point defining a second tangential plane having the second secondary point, the second direction, and the direction of the depth, and the first or the second side wall comprises a protrusion in between the first secondary point and the second secondary point, wherein the protrusion protrudes to the same direction from the first tangential plane and the second tangential plane.

In yet one example of the tread band 100 according to the application, in the first sipe, the curved line 210 comprises at least three deflection points in between the first secondary point and the second secondary point;

preferably the curved line 210 comprises at least four deflection points in between the first secondary point and the second secondary point;

more preferably the curved line 210 comprises at least four deflection points in between the first secondary point and the second secondary point and at least one of the deflection points has a deflection angle of less than 85 degrees.

Suitable measures for the sipe 21 of the tread block 100 are the same as those recited above for the sipes 21 of the tire 90 and/or tread block 200.

The tread band 100 can be seen as a tread band comprising the aforementioned tread block 200. The tire 90 can be seen as a tire comprising the aforementioned tread band 100. As indicated above, the properties of the first sipe 21, as indicated above, apply to tread block 200, tread band 100 and tire 90.

According to an embodiment of the present application, a lamella plate 43, 53, 63, 73, 83 (see FIGS. 2c, 4a, 4b, 5, 6, 7a, 7b, and 8) for use in the manufacturing process of a pneumatic tire 90, a tread band 100, or a tread block 200 according to an embodiment the present application, is configured to form such sipes 21 as discussed above. By means of the lamella plate 43, 53, 63, 73, 83, a sipe 21 is formed in the tread block 200 e.g. of a tread band 100 or a tyre 90. The lamella plate has a bottom surface 44, 54, 64, 74, 84, a top surface 45, 55, 75, 85 located apart from the bottom surface 44, 54, 64, 74, 84 in a direction of height h of the lamella plate 43, 53, 63, 73, 83. The lamella plate has a first side wall 46a, 56a, 66a, 76a, 86a and a second side wall 46b, 56b, 66b, 76b, 86b curved in a lengthwise direction L of the plate 43, 53, 63, 73, 83, wherein the lengthwise direction L is perpendicular to the height h. The side walls may have surfaces geometrically congruent to each other. A cross section of the lamella plate 43, 53, 63, 73, 83 with a plane P that has a surface normal that is parallel to the height h of the lamella plate 43, 53, 63, 73, 83 forms a curved line 110 (see FIG. 4a). In an embodiment, at each height within a range from a surface height hs to a first transition height h1, the curved line 110 comprises at least one deflection point 42, 52, 62, 72, 82, having an inner corner 420, 520, 620, 720, 820a, which has a radius of curvature under 0.3 mm, preferably under 0.2 mm, and more preferably from 0 to 0.2 mm, wherein the height is the distance between the top surface and the cross sectional plane P. Herein the height is measured from the top surface 44, 54, 64, 74, 84 of the lamella plate 43, 53, 63, 73, 83 towards the plane P. During manufacturing, the lamella plate 43, 53, 63, 73, 83 may be inserted into a tread bock 200 in such a way that a surface height hs of the lamella plate is arranged at the surface level of the tread block.

According to some examples of lamella plates 73, 83 of the present application, the difference between said first transition height h1 and said surface height hs may be at least 0.3 mm, 0.5 mm or at least 1.0 mm, such as from 0.3 mm to 6 mm, from 0.5 mm to 6 mm, or from 1.0 to 3 mm.

In an embodiment, at a certain height h greater than a second transition height h2, the curved line 110 comprises such bends 720b, 820b, of which radius of curvature is at least 0.3 mm or at least 0.5 mm. In an embodiment, at a height h greater than a second transition height h2, the curved line 110 comprises only such bends 720b, 820b, of which radius of curvature is at least 0.3 mm or at least 0.5 mm. In one example, the at least one deflection point 72, 82 has a deflection angle, which is less than 90 degrees, preferably less than 75 degrees. In one example, the deflection angle may be 90 degrees or more.

In some examples of the lamella plates 43, 53, 63, 73, 83 according to the application, the top surface 45, 55, 75, 85 of the lamella plate may be uneven or curved, whereby the height measured from the bottom surface 44, 54, 64, 74, 84 to the top surface 45, 55, 75, 85 of the lamella plate at a first primary point O1 is different from the height measured from the bottom surface 44, 54, 64, 74, 84 to the top surface 45, 55, 75, 85 of the lamella plate at a second primary point O2 (see FIG. 4a). The height h of the lamella plate at a central part thereof may be greater than the height at a boundary area thereof.

In one example, the a first side of the lamella plate comprises a projection or a recession and the second side of the lamella plate comprises a geometrically congruent recession or projection, respectively. In this way, the side of the lamella plate are configured to form a locking element configured to lock the first and second side walls of the sipe to each other in use.

In one example of the of the lamella plates 73, 83 according to the application, the first side wall 76a, 86a and the second side wall 76b, 86b may comprise at least two planes P1, P2 (FIG. 8) which form an angle with each other in the height-wise direction of the lamella plate in such a way that the intersection of these planes extends in a direction that forms an angle of at least 15 degrees with the direction of height of the lamella plate. The intersection of these planes may extends in a direction that forms an angle of at least 45 degrees or at least 60 degrees with the direction of height of the lamella plate.

In some examples of the lamella plates 73, 83 according to the application, the first side wall 76a, 86a and the second side wall 76b, 86b may comprise at least two planes P1, P2 which form an angle with each other in the height-wise direction of the lamella plate in such a way that the intersection of these planes extends in a direction of the top surface of the lamella plate (FIG. 8).

In one example of the lamella plate 53, 63 according to the application (see e.g. FIG. 6), the first side wall 56a, 66a and the second side wall 56b, 66b may be configured in such a way that for a given height

- at a first secondary point 58a, 68a, the line propagates in a first direction dir1, the first secondary point defining a first tangential plane having the first secondary point, the first direction, and the direction of the height,
- at a second secondary point 58b, 68b, the line propagates in a second direction dir2 that is parallel to the first direction or forms an angle of at most 30 degrees with the first direction, the second secondary point defining a second tangential plane having the second secondary point, the second direction, and the direction of the height, and
- the first or the second side wall comprises a protrusion 59, 69 in between the first secondary point 58a, 68a and the second secondary point 58b, 68b, wherein the protrusion 59, 69 protrudes to the same direction from the first tangential plane and the second tangential plane.

In yet one example of the lamella plate 53, 63 according to the application,

- the curved line 110 comprises at least three deflection points 52, 62 in between the first secondary point and the second secondary point;
- preferably
- the curved line 110 comprises at least four deflection points 52, 62 in between the first secondary point and the second secondary point;
- more preferably
- the curved line 110 comprises at least four deflection points 52, 62 in between the first secondary point and the second secondary point and
- at least one of the deflection points 52, 62, has a deflection angle of less than 90 degrees, less than 85 degrees, or less than 75 degrees.

In an embodiment, the minimum height of the lamella plate is at least 0.3 mm, such as at least 0.6 mm, e.g. at least 1 mm. In an embodiment, the maximum width of the lamella plate is at most 3 mm or at most 2 mm; such as from 0.2 mm 3 mm or from 0.2 mm to 2 mm. In an embodiment, the length of the lamella plate is from 4 mm to 10 cm, such as from 1 cm to 10 cm. As is evident, an arrangement of lamella plates is configured to form at least some of the sipes of the tire. The dimensions of the lamella plates of the arrangement of lamella plates may vary according to the needs, as indicated above for the corresponding sipes. For an arrangement of lamella plates comprises a first lamella plate and a send lamella plate, wherein the length of the second lamella plate is greater the length of the first lamella plate.

The lamella plate according to an embodiment of the application comprises metal; preferably the lamella plate consists of a metal or a metal alloy.

The lamella plate can be used to manufacture at least one of a tread block 200, a tread band 100, or a tire 90.

A method for manufacturing a lamella plate according to an embodiment of the application comprises removing material from a preform for the lamella plate. Thus, the lamella plate may be machined from the preform. In the alternative (or in addition) such a method could comprise adding material to a preform for the lamella plate. Adding material may include e.g. use of adhesives and/or use of 3D printing techniques. In this way, the sharp corners are possible to be achieved. In an embodiment, the lamella plate is not bent, but is only manufactured by adding and/or removing material. Naturally, in an embodiment, the plate may also be bent; however sharp corners may not be obtained solely by bending.

BRIEF DESCRIPTION OF THE DRAWINGS

FIG. 2c shows a sipe as manufactured by the lamella plate of FIG. 4a;

FIG. 4b shows a top view of the lamella plate shown in FIG. 4a;

FIGS. 11a1 to 11a3 show a part of a tread block with sipes in a first configuration according to an embodiment, FIGS. 11b1 to 11b3 show a part of a tread block with sipes in a second configuration according to an embodiment.

DETAILED DESCRIPTION

Figure 8:
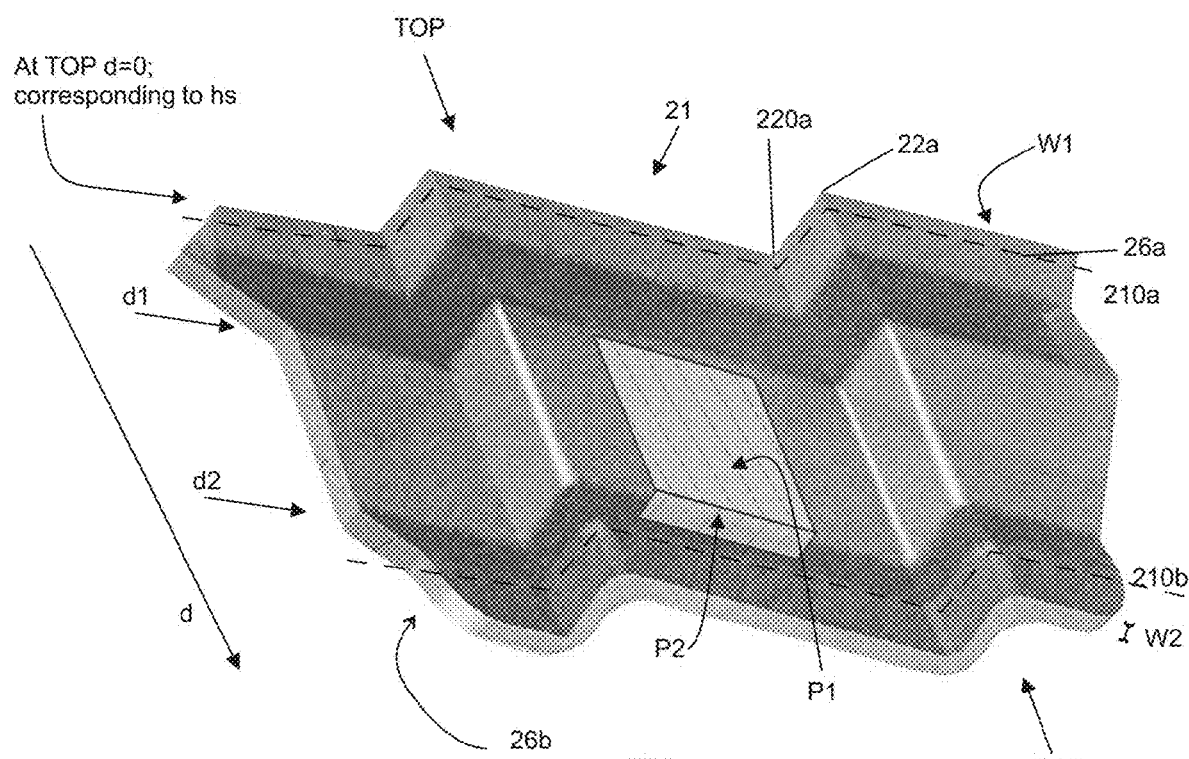
FIG. 8 shows a sipe having been made by the lamella plate of FIGS. 7a and 7b.
Figure 9:
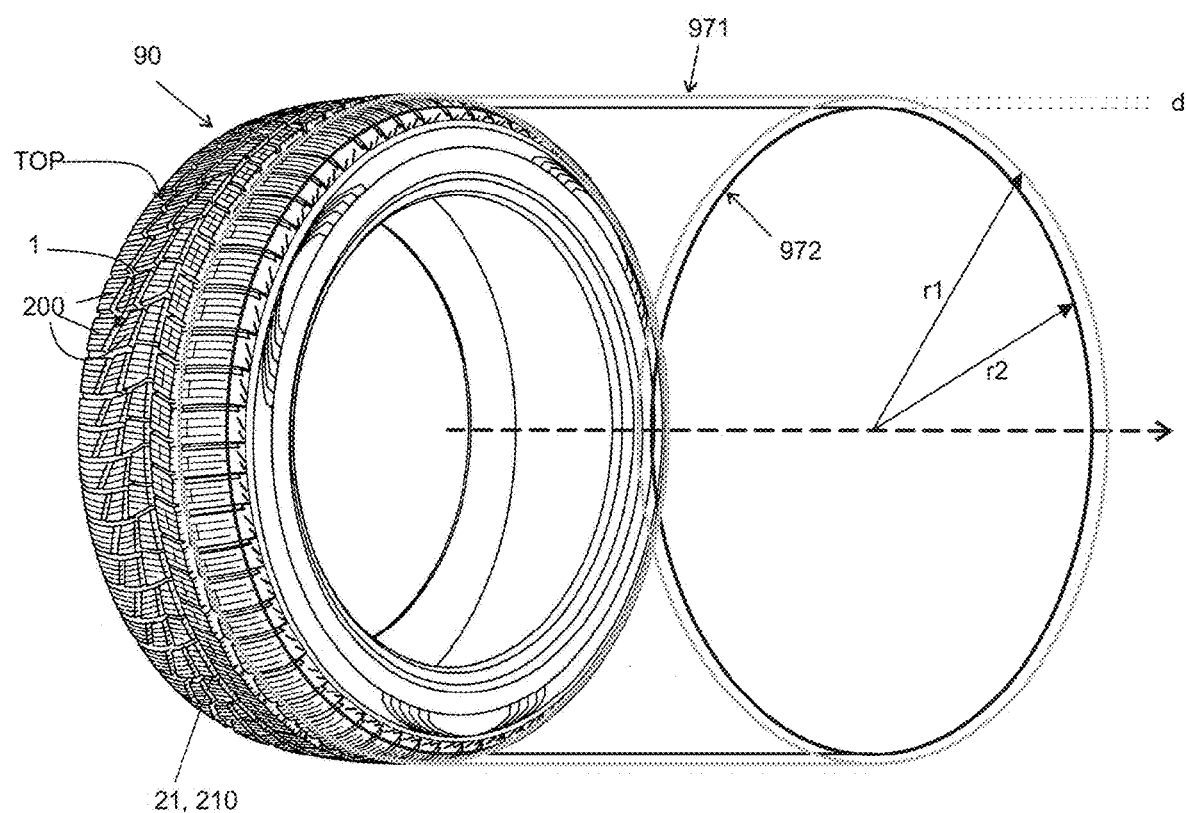
FIG. 9 shows, in a perspective view, a tire 90 and a co-axial an co-centric cylinder 97 intersecting with a sipe 21.
Figure 10A:
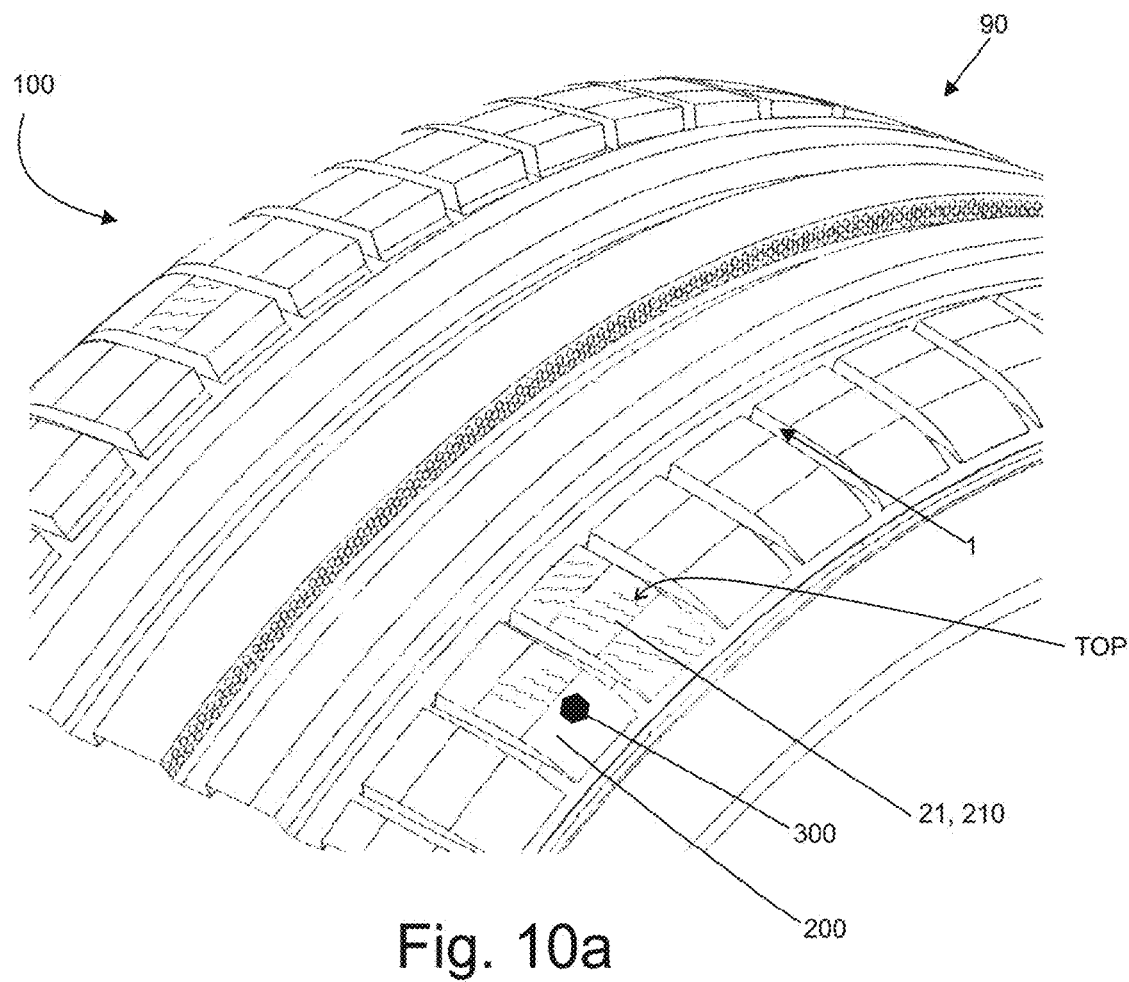
FIGS. 10a and 10b show a, in a perspective view and side view, a tread band on a tire and surfaces 107a and 107b that are geometrically congruent and parallel with the surface of the tread block 200.
Figure 10B:
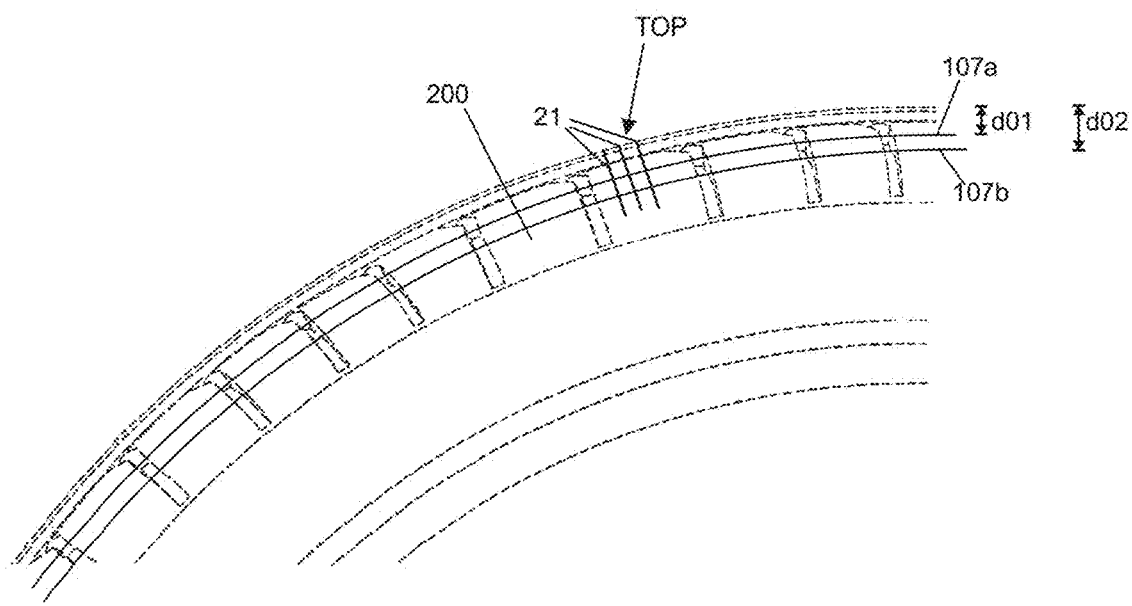
Figure 12A:
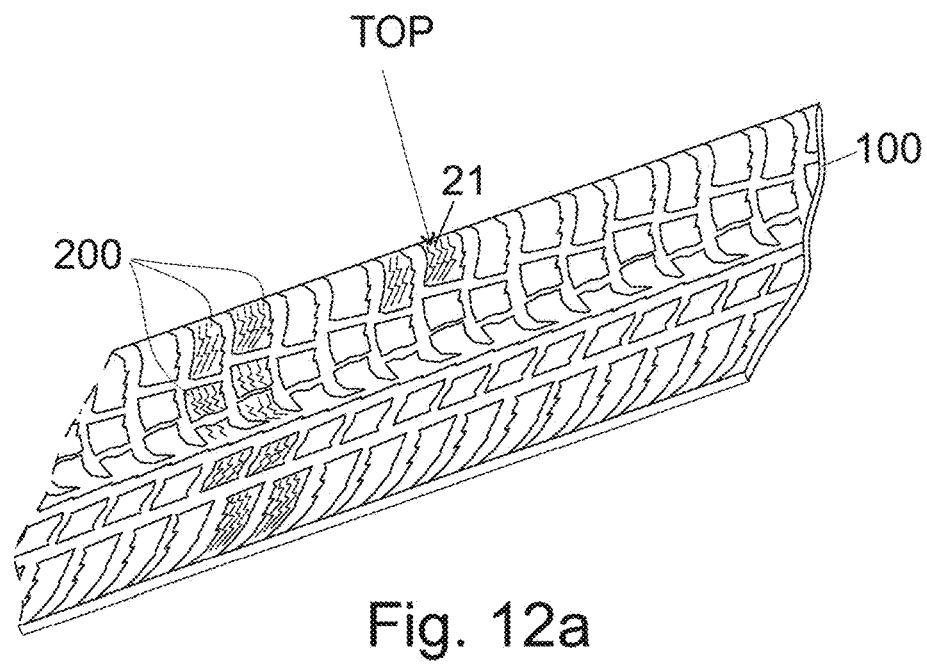
FIG. 12a shows a tread band.
Figure 12B:
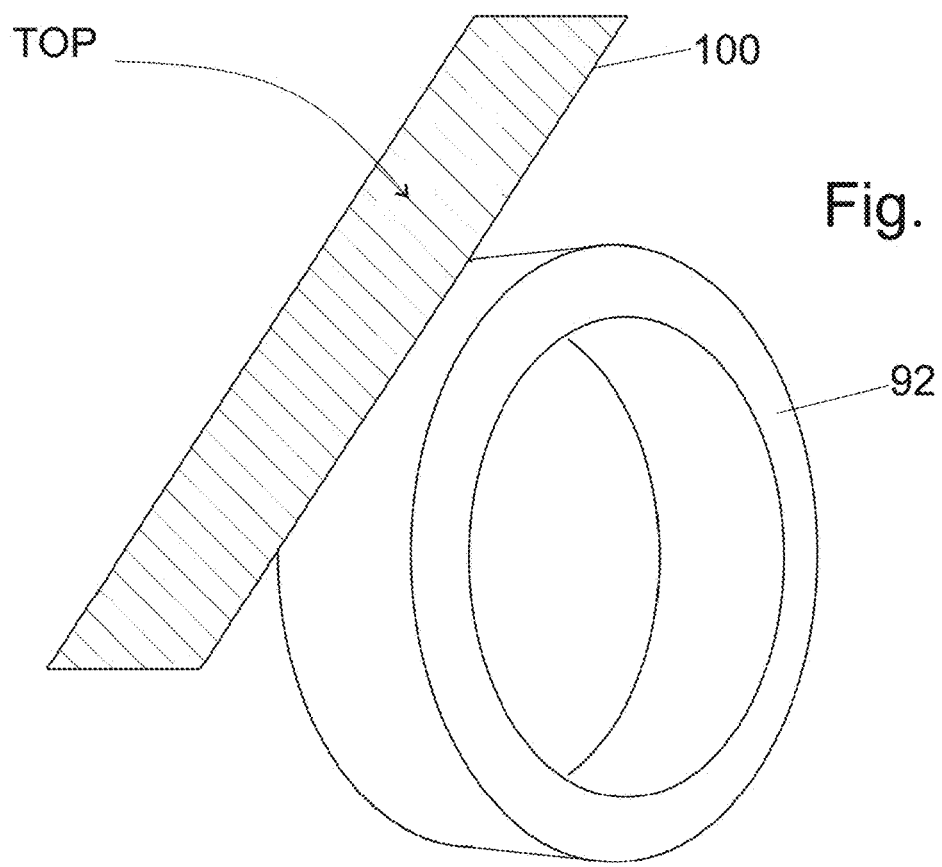
FIG. 12b shows the application of a tread band on a preform of a tire to form a tire.

FIG. 9 shows a tire 90 having a tread. The tread may be patterned to the tire using a suitable tool by moulding, or the tread may have been made by applying a tread band 100 onto a preform of a tire 92 (FIGS. 12a and 12b). The tire tread comprises tread blocks 200 with sipes 21. The function of the sipes 21 has been discussed above in the section background. The shape of the sipes 21 have a technical effect on how well the sipes function for their purpose. FIGS. 10a and 10b show, in a perspective view and side view, a tread band 100 on a tyre 90 and two surfaces 107a, 107b that are geometrically congruent and parallel with the surface of the tread block 200. In FIGS. 10a and 10b only a few sipes 21 are illustrated for the sake of illustrative clarity. The surface 107a defines the curved line 210 at a first depth d01 (such lines 210 are indicated e.g. in FIGS. 10a, 9 and 2a). The surface 107b defines the curved line 210 at a first depth d02. Such depths d01 and d02 may give rise e.g. to the curved lines 210a and 210b of FIG. 8. A tread block 200 comprises rubber, such as synthetic rubber or natural rubber. A tire 90 typically comprises a reinforcing belt structure, plies, sidewalls, and beads. Beads are configured to be fitted on a wheel of a vehicle.

Referring to FIG. 9, the tire 90 includes a tread, said tread having a cylindrical shape 971 with a first radius r1. The tread comprises tread blocks 200 provided with sipes 21. At least some of the sipes have an open top end TOP (see FIGS. 1, 2c, and 8) to the surface of the tread block 200 and a bottom BOT (FIG. 8) located in the tread block. Thus, the sipes 21 have a first side wall 26a and a second side wall 26b (see FIG. 2a) curved in the lengthwise direction of the sipe 21. The intersection of at least one of the sipes 21 with a surface of a cylinder 972 that is coaxial with the tire and has a second radius r2 forms the curved line 210 at a depth d, wherein the depth d is the difference between the first radius r1 and the second radius r2 (see FIG. 9). In this way, the shape of the curved line 210 may depend on the depth at which the sipe is observed. Moreover, as the tire 90 wears, deeper portions of the sipe become exposed on the surface of the tread block 200. Referring to FIGS. 9, 10a, 10b, 2a, and 2b, according to an embodiment, at least one of the sipes 21 is shaped in such a way, that at all depths within a range from the open top of the sipe to a first transition depth d1, the curved line 210 defined by the congruent side walls comprises at least one deflection point 22a having a sharp inner corner 220a. This corresponds to a new, unworn tire 90. As indicated above, when the tire 90 wears, the appearance of the sipe may change.

Figure 2A:
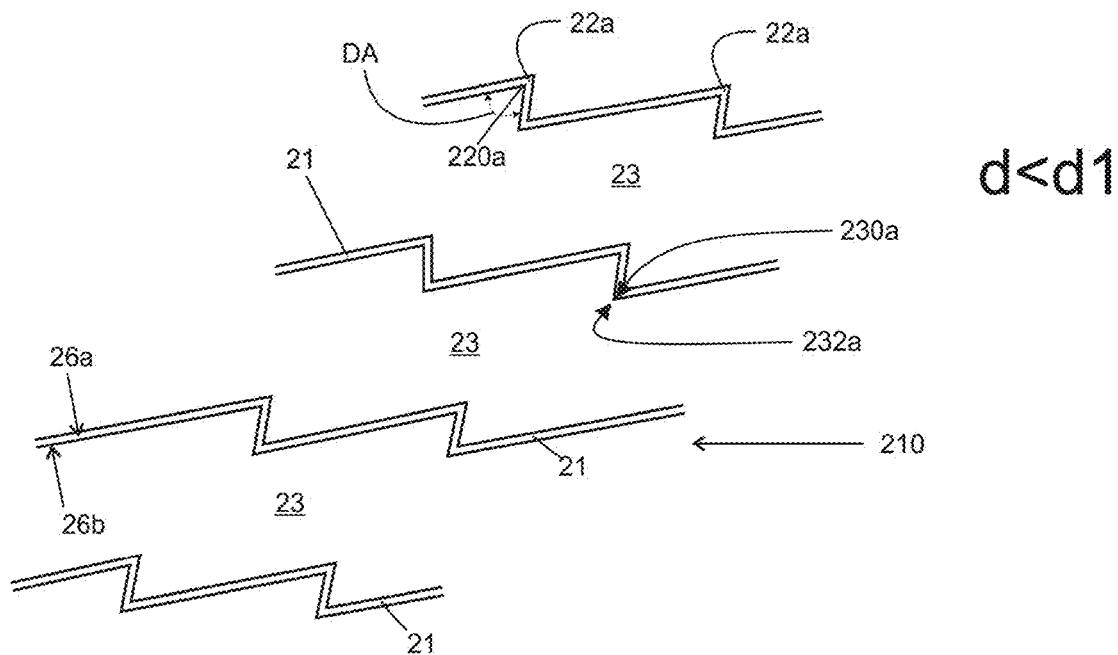
FIG. 2a shows a close view of examples of sipes according to the present application at a depth below a first transition depth.
Figure 2B:
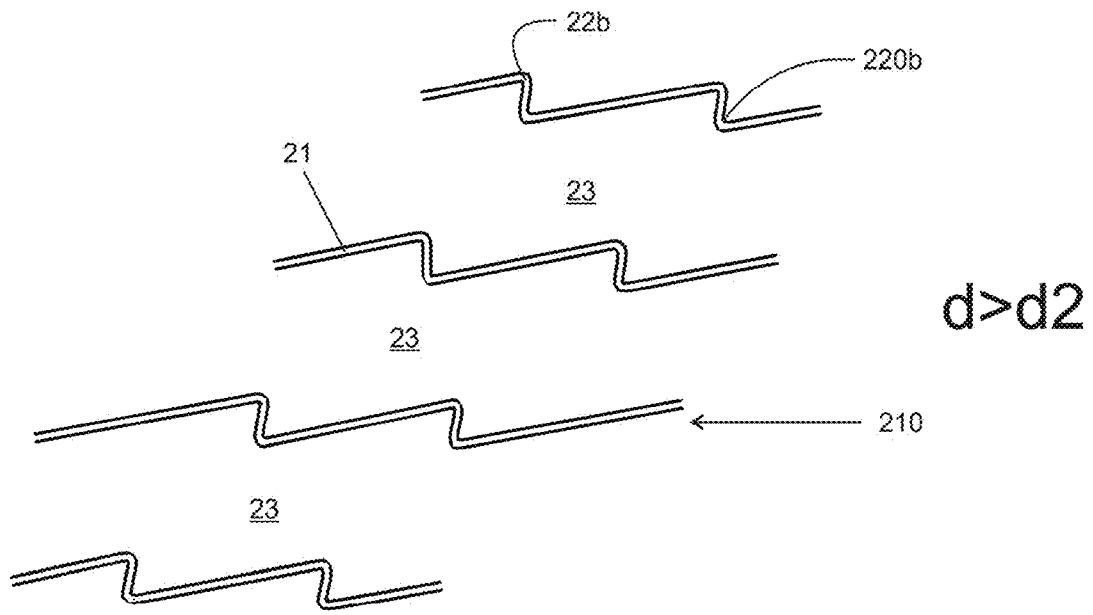
FIG. 2b shows a close view of examples of sipes according to an embodiment of the present application at a depth greater than a second transition depth.

In connection with the specification of the present application, the term "sharp" refers to a deflection point 22a of the curved line 210, which deflection point 22a has an inner corner 220a with a small radius of curvature (see FIG. 2a). According to one example of the application, the radius of curvature of the sharp inner corner 220a may be under 0.3 mm. According to another example of the application, the radius of curvature of the sharp inner corner 220a may be under 0.25 mm. According to yet other examples of the application, the radius of curvature may be from 0 to 0.2 mm. The sharp inner corner 220a may be so sharp that with a naked eye the deflection point 22a looks like a cross point of two lines, such as two straight lines or two curves with much larger radius of curvature (e.g. at least 1 cm). In other words, in an embodiment, no rounding of the inner corner 220a can be observed by the naked eye. It is noted, that when the curved line 210 has a deflection point 22a with a sharp inner corner 220a, the corresponding outer corner of the lamella 23, which forms the side of the sipe, is also sharp.

Correspondingly, the curved line 210 may comprise such an outer corner 232a that the sipe 21 itself, at that point, has a sharp inner corner 230a. What has been said above about the sharpness of the inner corner 220a of the curved line 210 applies equally to the a sharp inner corner 230a of the sipe 21.

It has been found that when the inner corner is sharp in the aforementioned meaning, referring to the inner corner 220a of the curved line 210 and/or the inner corner 230a of the sipe 21, the grip of the tire tread improves a lot. Most likely such a sharp part of the tire bites firmly to surface, such as the road or ground. In particular, when the inner corner 220a of the curved line 210 is sharp, the outer corner of the lamella 23 is also sharp. Such a sharp outer corner of the lamella 23 bites firmly to surface. In addition, thanks to the sharp edges, lamellas 23 (i.e. the part of the tyre in between the sipes 21) can work more efficiently in the sense of improved gripping and improved stability, because of the more efficient locking of the lamella to each other.

In an embodiment, the first transition depth is at least 6 mm. In such an embodiment, the sipe may have a sharp corner substantially the whole life of a tyre, provided that the tire is configured to wear 6 mm during use. In an embodiment, the tire comprises a groove 1 having a groove depth dG; and the first transition depth d1 is at least dG-dGR, i.e. at least the groove depth dG subtracted by a remaining grove depth dGR. Here the remaining grove depth dGR refers to the remaining groove depth of a tire that has worn to the extent that it is no longer safe (or even legal) to use it. The remaining groove depth may be e.g. at least 2 mm, such as 2 mm, 3 mm or 4 mm. The groove depth of a new tire may be e.g. at least 6 mm, such as 6 mm, 8 mm, or 10 mm. The groove 1 is left in between two tread blocks 200. Specific examples of the pairs (dG; dGR) include (6 mm; 2 mm), (8 mm; 2 mm), (10 mm; 2 mm), (6 mm; 3 mm), (8 mm; 3 mm), (10 mm; 3 mm), (6 mm; 4 mm), (8 mm; 4 mm), and (10 mm; 4 mm). Other groove depths dG and first transition depths d1 may be applied according to needs.

In an embodiment, the side walls 26a, 26b of the sipe 21 have surfaces that are geometrically congruent to each other. Such congruent surfaces improve the locking of the adjacent lamellas 23 to each other during driving.

In connection with the specification of the present application, the term "congruent" is used to describe objects having the same shape and size, or objects of which one has the same shape and size as the mirror image of the other. For example, side walls that have surfaces geometrically congruent to each other are two opposing side walls having the same shape and size in a three-dimensional manner. Moreover, the side wall 26a of a sipe 21 is formed by a lamella plate; whereby the side wall 26a is geometrically congruent to a part of a side of the corresponding lamella plate. Furthermore, the surface, of which intersection with the sipe 21 defines the line 210 has the same shape as the surface of the tread block, whereby this intersecting surface is also congruent with the surface of the tread block.

FIG. 2a shows a close view of some examples of sipes 21 according to the present application. Specifically, FIG. 2a shows an intersection of the sipes 21 with a surface of a cylinder 972 that is coaxial with the tire 90 at a certain depth d, which is less than a first transition depth d1. The depth d may be zero, whereby FIG. 2a may show the shape of the sipes 21 of the open top TOP (cf. FIGS. 2c and 8). As can be seen in FIG. 2a, the curved line 210 and/or the sipe 21 defined by the two side walls 26a and 26b, include sharp corners 220a and 230a in the aforementioned meaning. The transition depths d1 and d2 are best illustrated in FIG. 8. Values for the first transition depth d1 as have been recited above. Up to the first transition depth d1, a curved line 210 or a sipe 21 comprises a sharp corner 220a, 230a in the aforementioned meaning. One of the effects brought by this configuration is to improve grip also for somewhat worn tires. The first transition depth may be e.g. at least 6 mm, whereby a lamella 23 has a sharp corner throughout the service life of a tire.

The inner corner 220a of the curved line 210 defines also a deflection angle DA, as indicated in FIG. 2a. In one example the deflection angle DA may be less than 90 degrees, preferably less than 85 degrees. In another example, the deflection angle DA may be less than 75 degrees. One of the effects brought by this configuration is to improve grip. In some examples, it is also possible that the deflection angle is 90 degrees or more. Examples include an angle DA of less than 150 degrees or less than 120 degrees.

Figure 4A:
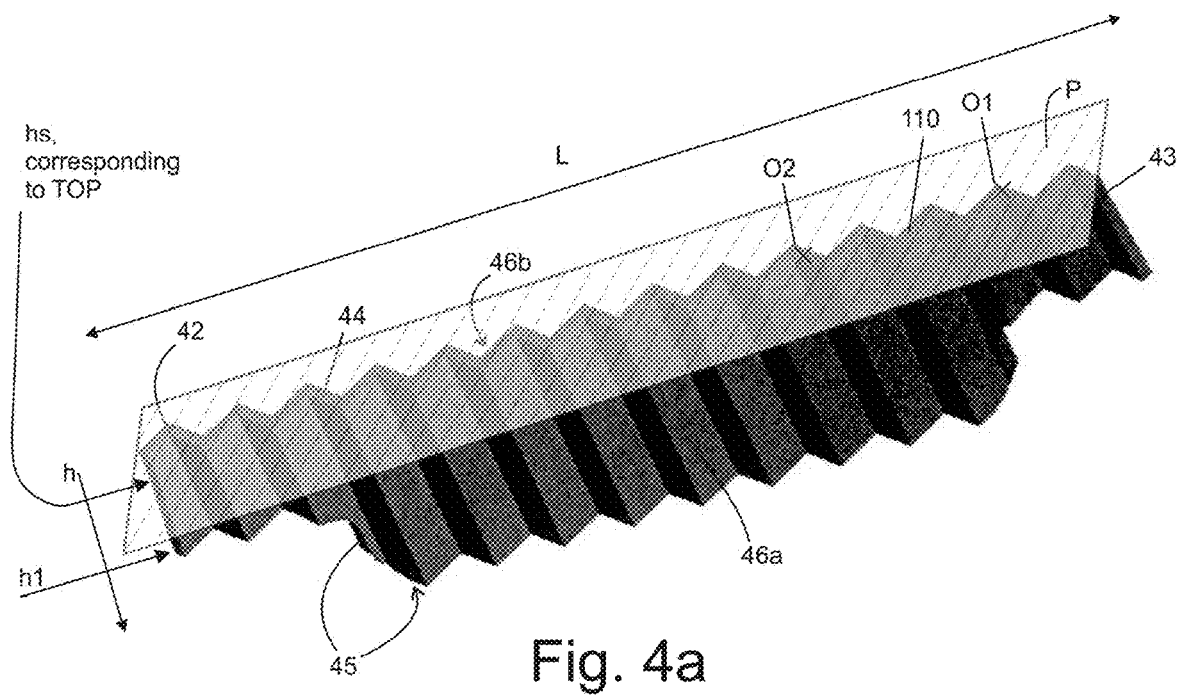
FIG. 4a shows an example of a lamella plate according to the present application.
Figure 4B:
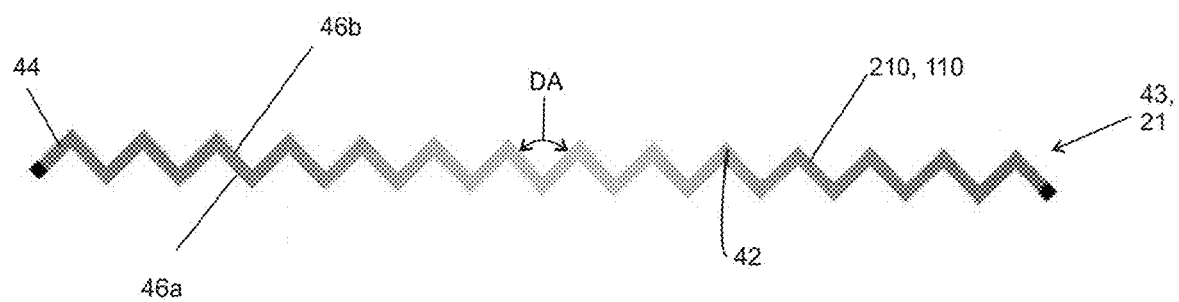
Figure 5:
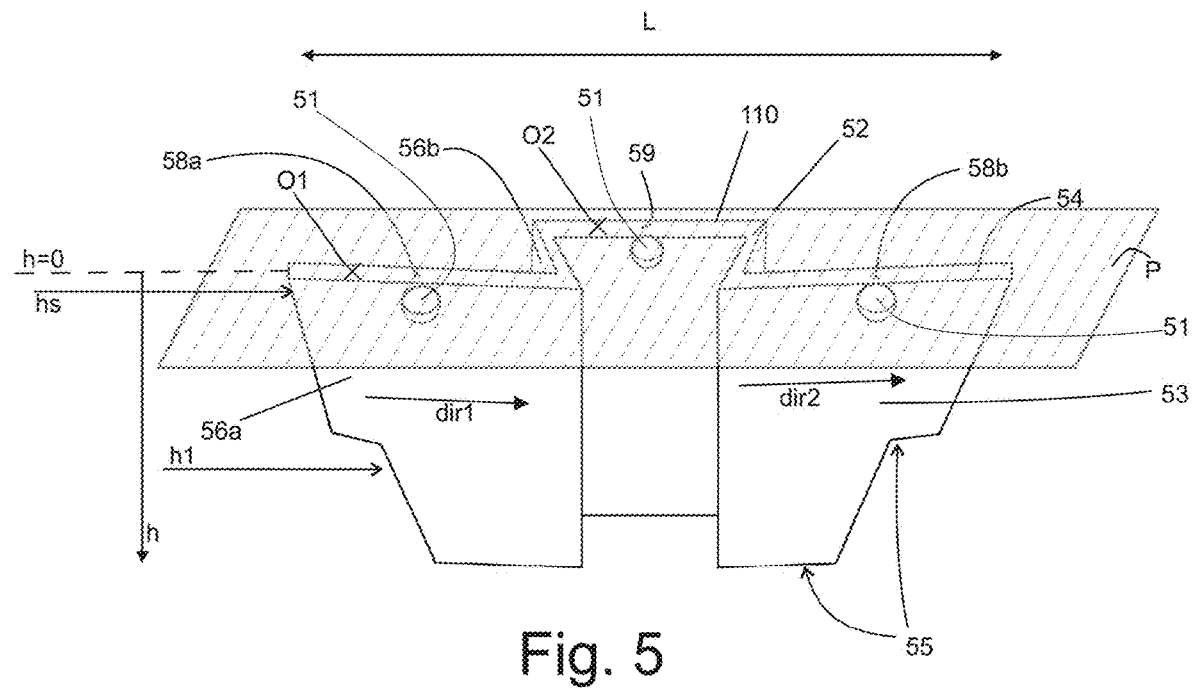
FIG. 5 shows another example of lamella plate according to an embodiment.
Figure 7A:
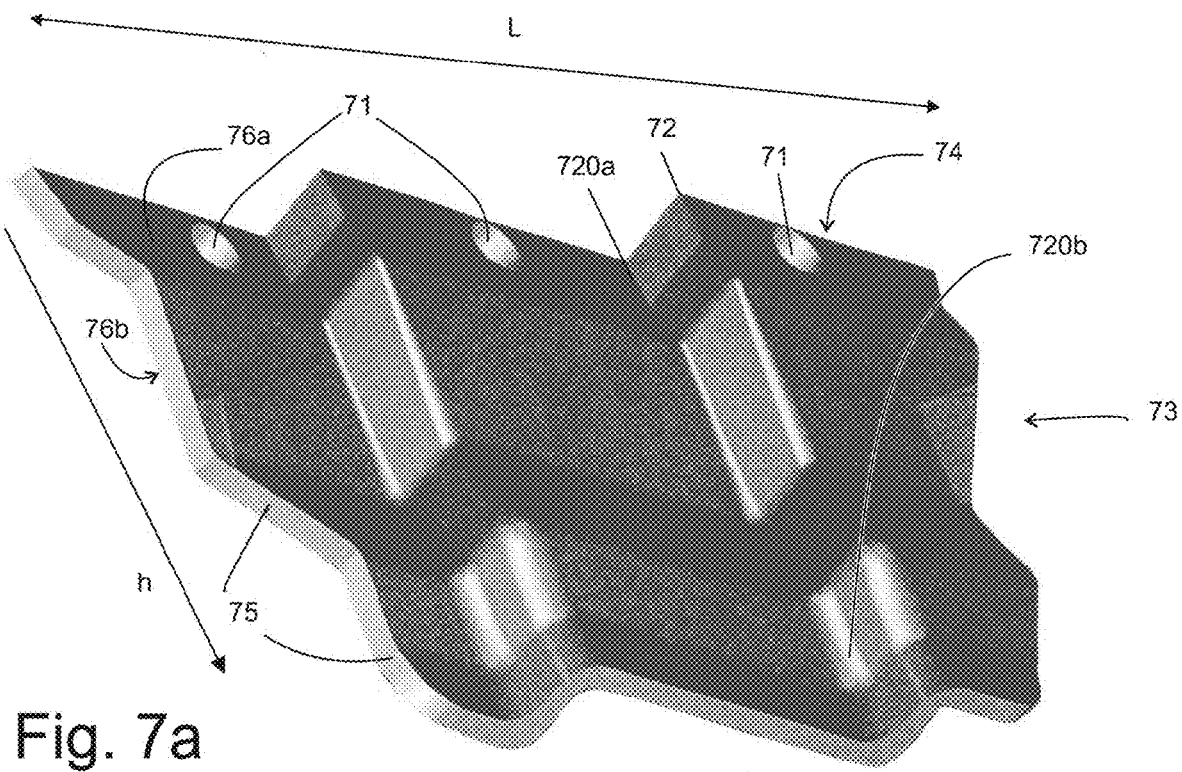
FIGS. 7a and 7b show an example of lamella plate according to an embodiment.
Figure 7B:
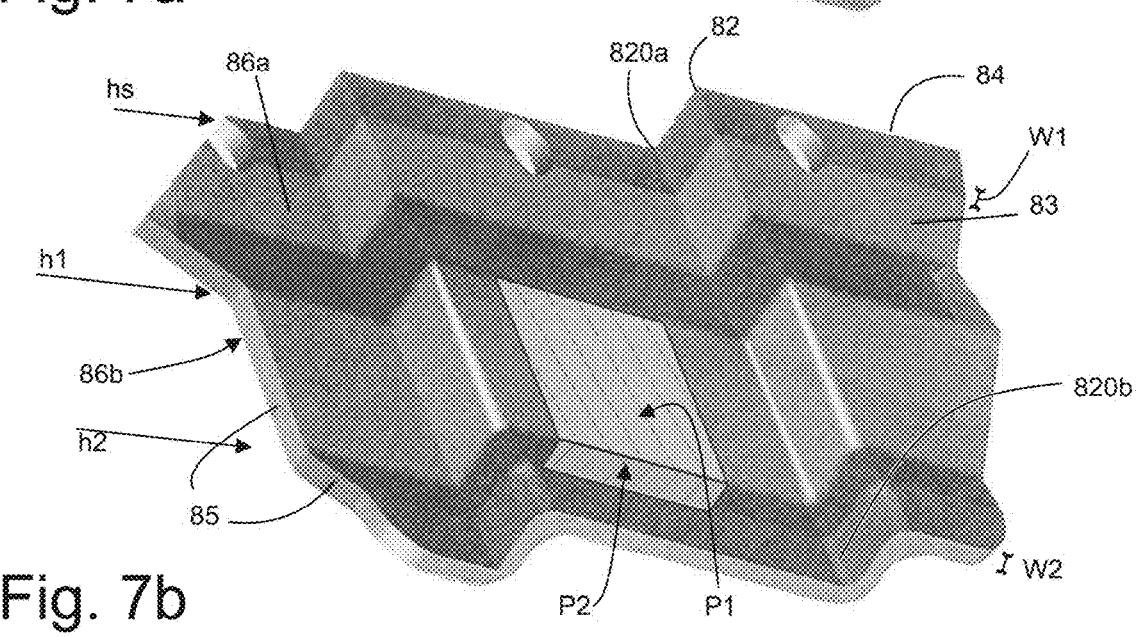

Such a sipe 21 can be manufactured by a lamella plate 43, 53, 63, 73, 83. Examples of lamella plates are shown in FIGS. 4a, 5, and 7a. Such a lamella plate 43, 53, 63, 73, 83 is inserted into the tread block 200, whereby the lamella plate forms a sipe 21 to the tread block such that the shape of the sipe 21 matches the shape of the lamella plate 43, 53, 63, 73, 83. In particular, the top surface 45, 55, 75, 85 of the lamella plate is inserted into the tread block to form the bottom BOT of the sipe 21. As indicated in FIGS. 5 and 7 a lamella plate may comprise holes 51, 71. The function of the holes is to enable the flow of rubber from one side of the lamella plate to the other side thereof. Enabling the flow is beneficial, when the sipes comprise sharp corners in the aforementioned sense. However, a lamella plate without such holes may also suffice, as indicated in FIG. 4a. During manufacturing, the lamella plate 43, 53, 63, 73, 83 may be inserted into a tread bock 200 in such a way that a surface height hs of the lamella plate is arranged at the surface of the tread block. Thus, the surface height hs of the lamella plate corresponds to the top TOP of the sipe. At the TOP, the depth d of the sipe is zero. An example of a surface height hs is shown in FIG. 7b; and a corresponding sipe 21 together with its open top TOP is shown in FIG. 8. The surface height hs may be zero.

FIGS. 4a, 4b, 5, 6, 7a, and 7b show examples of lamella plates 43, 53, 63, 73, 83 according to an embodiment. With such lamella plates 43, 53, 63, 73, 83 the sipes 21 with sharp corners according to some embodiments of the present application can be made. As a mold piece having a positive volume, a part of the lamella plate 43, 53, 63, 73, 83 creates in the tire 90 or tread band 100 an empty space, i.e. the sipe 21, corresponding to the shape of the lamella plate. The lamella plate 43, 53, 63, 73, 83 can be made for instance by (at least) an additive process (e.g. 3D printing and/or using adhesive) and/or a removing process (e.g. machining) in the shape illustrated in FIGS. 4a, 4b, 5, 6, 7a, and 7b.

Figure 3A:
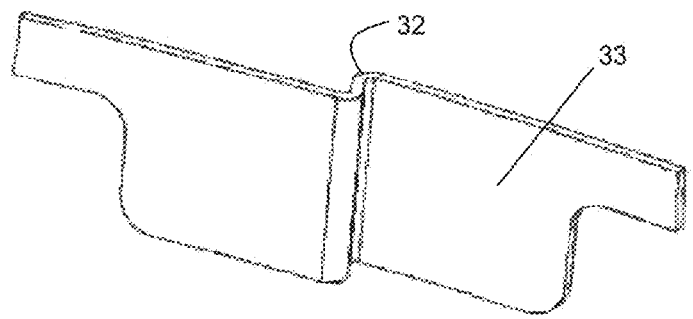
FIGS. 3a and 3b show conventional lamella plates.
Figure 3B:
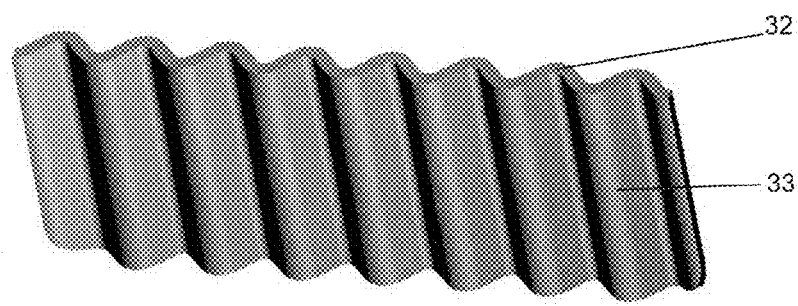

As can be seen in FIGS. 4a, 4b, 5, 6, 7a, and 7b, the top view of the lamella plates 43, 53, 63, 73, 83 also has sharp corners. That is, the curved line 110, which is formed by the intersection of the lamella plate 43, 53, 63, 73, 83 and a plane P that has a surface normal that is parallel to the height h of the lamella plate (see FIG. 4a), comprises at least one sharp inner corner, as defined above. In addition or alternatively, the lamella plate itself comprises a sharp inner corner. This is in contrast to the conventional lamella plates 33 as shown in FIGS. 3a and 3b, which are obtainable by bending a metal plate only to a reasonably large radii of curvature.

Such a lamella plate 43, 53, 63, 73, 83 may be used for manufacturing a tread block 200, a tread band 100, or a tire 90. The lamella plate may be applied in the tread block 200, a tread band 100, or a tire 90 such that the height h of the plate is parallel to the depth of the sipe. In the alternative, the lamella plate may be applied at an angle (i.e. the height of the lamella plate forming an angle with the radial direction of the tire and/or surface normal of the tread block).

In the examples as shown in FIGS. 4a and 5, the side walls 46a, 46b, 56a, 56b of the lamella plates 43, 53 have several flat surfaces that include the direction of the height h of the lamella plate. In such examples, the transition height in these figures is large, whereby the curved line 110 defined by the side walls 46a, 46b, 56a, 56b has sharp corners all the way up to the top of the lamella plate 43, 53.

Also, it can be seen in FIGS. 4a, 4b, 5, 6, 7a, and 7b that the top surface 45, 55, 75, 85 of the lamella plate may by uneven or curved, whereby the height measured from the bottom surface 44, 54, 74, 84 to the top surface 45, 55, 75, 85 of the lamella plate at a first primary point O1 is different from the height measured from the bottom surface 44, 54, 74, 84 to the top surface 45, 55, 75, 85 of the lamella plate at another, second primary point O2. One of the effects brought by this configuration is to improve resistance to tearing stress of the tire in between the neighboring sipes. Another effect brought by this configuration is to support the lamellas and the tread block comprising the lamella against transverse forces. For example, having a sipe deeper in the central part than in a boundary area (or both boundary areas) will increase the transverse stiffness of the tread block and the lamella. In an embodiment, the height of the lamella plate at the first primary point O1 is less than the height of the lamella plate at the at the second primary point O2 and the second primary point O2 is located closer to a center of the lamella plate than the first primary point O1.

Figure 1:
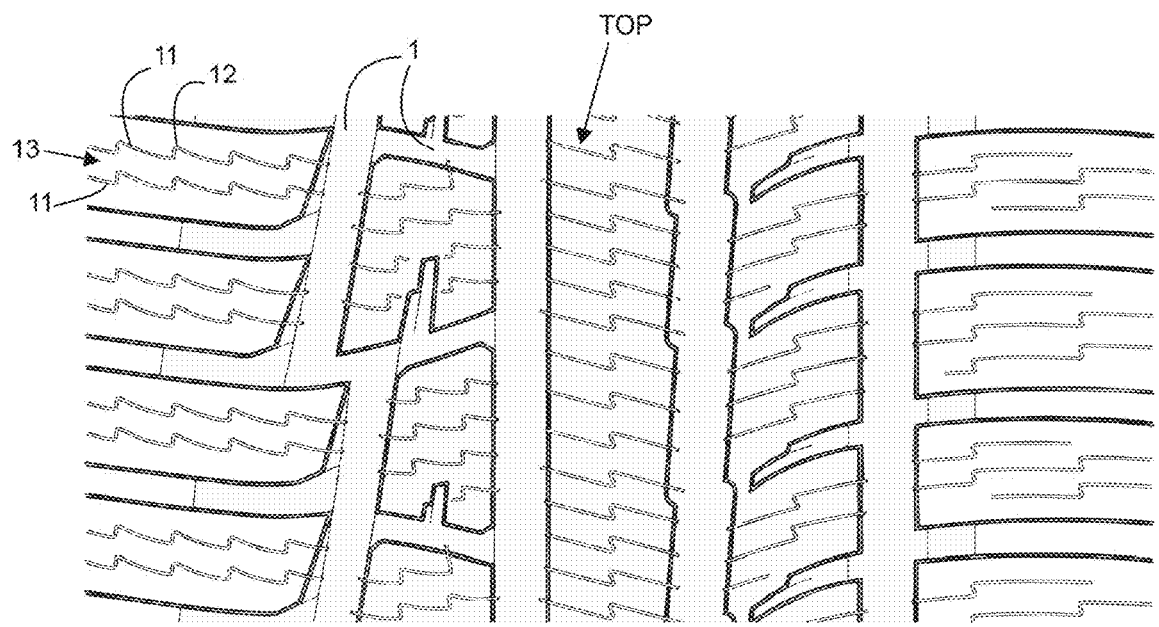
FIG. 1 shows a part of a tread of a conventional pneumatic tire.
Figure 2C:
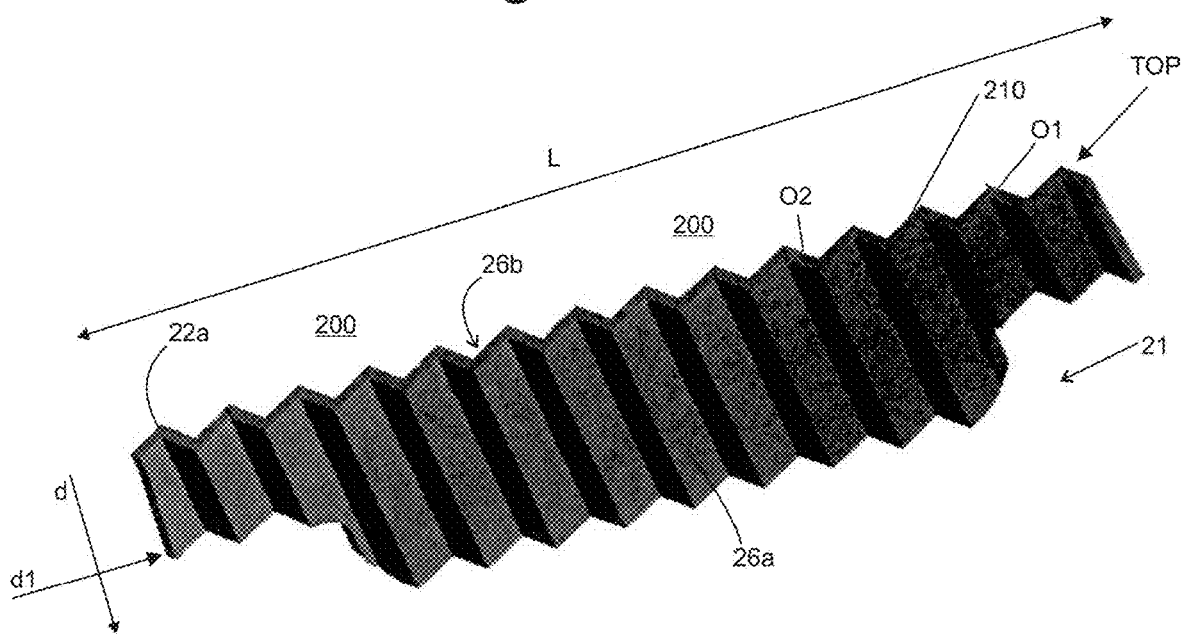

As shown in the FIG. 11a1, sipes 21 according to one embodiment of the present application may be in a zigzag configuration. When a force F, which is a lateral force to a tire, applies from a first direction, the tread block is deformed in such a way that the stressed part of the tread block is moved by the force F to have its side walls partially attached to parts of the side walls of the neighboring parts of the tread block, side parts of the side walls being perpendicular to the direct of applied force F, as shown in FIG. 11a2. The deformation of the tread block is limited by the resistance of the neighboring parts, so that the lateral grip of the tire tread is improved. However, when the force F is applied from an opposite direction, the deformation of the tread block is larger, as shown in FIG. 11a3. Therefore, the lateral grip of the tire tread may be weaker in one side than the other side.

In order to further improve the grip, an embodiment further provides another configuration of lamella plate and a corresponding sipe 21. In the example related to a lamella plate, as shown in FIGS. 5 and 6, the first side wall 56a, 66a and the second side wall 56b, 66b may be configured in such a way that at a first secondary point 58a, 68a, the curved line 110 propagates in a first direction dir1 the first secondary point 58a, 68a defining a first tangential plane (plane1, FIG. 6) having the first secondary point 58a, 68a, the first direction dir1 and the direction of the height h of the lamella plate, at a second secondary point 58b, 68b, the curved line 110 propagates in a second direction dir2 that is parallel to the first direction dir1 or forms an angle of at most 30 degrees with the first direction dir1, the second secondary point 58b, 68b defining a second tangential plane (plane2, FIG. 6) having the second secondary point 58b, 68b, the second direction dir2, and the direction of the height h of the lamella plate, and the first or the second side wall 56a, 66a, 56b, 66b comprises a protrusion 59, 69 in between the first secondary point 58a, 68a and the second secondary point 58b, 68b, wherein the protrusion 59, 69 protrudes to the same direction from the first tangential plane and the second tangential plane.

Figure 6:
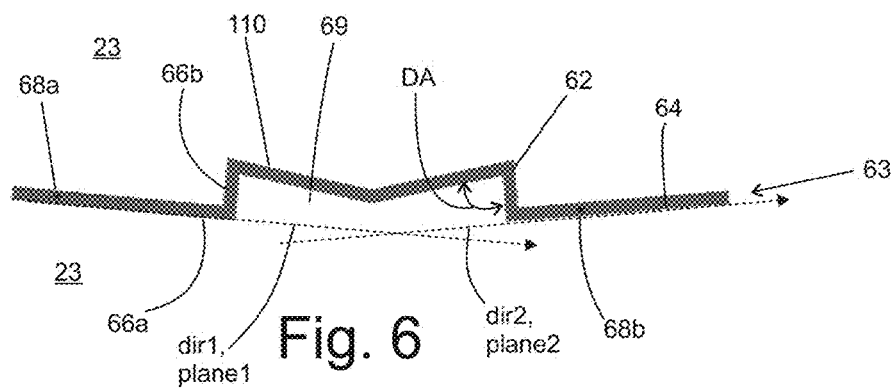
FIG. 6 shows a top view of another example of lamella plate, which has a similar shape as the one shown in FIG. 5, according to an embodiment.

In FIG. 6, a lamella 23 formed by the lamella plate extends from the first or the second tangential plane (plane1, plane2) towards the second or the first tangential plane, respectively (plane2, plane1), and extends as protrusion on also on the other side of the second or the first tangential plane, respectively (plane2, plane1).

In the example as shown in FIG. 5, the curved line 110 comprises four deflection points 52, and the deflection points 52 have an acute deflection angle; in the example as shown in FIG. 6, the line comprises five deflection points 62, and some of the deflection points 62 have an acute deflection. The acute deflection angle DA may be e.g. less than 90 degrees, less than 85 degrees, or less than 75 degrees.

A corresponding sipe 21 of a tire 90 or tread band 100, indicated in FIG. 11b1, is shaped in such a way that at a first secondary point, the curved line 210 propagates in a first direction dir1, the first secondary point defining a first tangential plane (plane1, FIG. 11b1) having the first secondary point, the first direction dirt and a direction of a sidewall 26a, 26b of the sipe 21 at the first secondary point, the direction of the sidewall 26a, 26b being perpendicular to the first direction dir1, at a second secondary point, the curved line 210 propagates in a second direction dir2 that is parallel to the first direction dir1 or forms an angle of at most 30 degrees with the first direction dir1, the second secondary point defining a second tangential plane (plane2, FIG. 11b1) having the second secondary point, the second direction dir2, and a direction of a sidewall 26a, 26b of the sipe 21 at the second secondary point, the direction of the sidewall 26a, 26b being perpendicular to the second direction dir2, and the first or the second side wall 26a, 26b comprises a protrusion 59, 69 in between the first secondary point and the second secondary point, wherein the protrusion 59, 69 protrudes to the same direction from the first tangential plane and the second tangential plane.

It is noted that the first and second tangential planes may comprise the radial direction of the tire 90, if the sipes are formed by inserting the lamella plate into the tire such that the height h is parallel to a radial direction of the tire. In such a case, the aforementioned a direction of a sidewall 26a, 26b of the sipe 21, the direction of the sidewall 26a, 26b being perpendicular to the first (or second) direction at the first (or second) secondary point would be parallel to the depth of the sipe 21, i.e. the radial direction; or in case of a tread block, parallel to the normal of the surface of the tread block.

Referring to FIG. 6, in an embodiment, a lamella 23 limiting a sipe 21 extends from the first or the second tangential plane (plane1, plane2) towards the second or the first tangential plane, respectively (plane2, plane1), and extends as protrusion on also on the other side of the second or the first tangential plane, respectively (plane2, plane1). Such sipes 21 are shown in FIGS. 11b1 to 11b3. In the example as shown in FIGS. 11b1 to 11b3, the curved line 210 comprises five deflection points, in between the first secondary point and the second secondary point. Some of the deflection points have an acute deflection angle. The acute deflection angle DA may be less than 85 degrees.

FIGS. 11b1 to 11b3 show an example of tread block having the sipes manufactured with the lamella plates having the configuration as defined above. As can be seen in the FIGS. 11b2 and 11b2, the deformation of the tread block is equally well limited when the force F applies either of the longitudinal directions of the sipe. Therefore the grip of the tire tread as well as the handling of the tire are improved in many directions. Moreover, It has been found that when a deflection angle is less than 90 degrees, such as less than 85 degrees or less than 75 degrees, and the corresponding inner corner is sharp in the aforementioned meaning, the grip of the tire tread improves a lot. Most likely such a sharp part of the tire bites firmly to ground.

In the examples as shown in FIGS. 7a and 7b, the side walls 76a, 76b, 86a, 86b of the lamella plates 73, 83 have bent surfaces in the height-wise direction h. In other words, the surface comprises at least two planes P1, P2 which form an angle with each other. The angle may be around 90 degrees, so that a stairs-like configuration is formed. The angle may also be more the 90 degrees, so that a slope-like configuration is formed. The at least two planes P1, P2 which form an angle with each other in the height-wise direction of the lamella plate in such a way that the intersection of these planes extends in a direction of the top surface of the lamella plate. One of the effects brought by this configuration is to provide shape-locking of the side walls of the sipes. As is evident, the sipe 21 formed with such a lamella plate, as indicated in FIG. 8, also comprises the aforementioned at least two planes P1, P2. These planes P1, P2 form an angle with each other in the depth-wise direction of the sipe 21 in such a way that the intersection of these planes extends in a direction that is not perpendicular to the direction of the tread surface of the tire 90 or the tread band 100. Examples of the such angles have been given above.

Such shapes are examples of a more general shape-locking of neighbouring lamella to each other in use. In an embodiment, the first side wall 26a of the sipe 21 comprises a projection or a recession and the second side wall 26b of the sipe 21 comprises a geometrically congruent recession or projection, respectively. In this way, the first and second side walls 26a, 26b form a locking element configured to lock the first and second side walls 26a, 26b to each other.

In the examples as shown in FIGS. 7a and 7b, in between the surface height hs and the first transition height h1 the curved line 110 line defined by the side walls has sharp corners 720a, 820a. The lamella plate may comprise at least one sharp corner in the aforementioned meaning at all heights from the aforementioned surface height hs to the first transition height h1. The first transition height h1 may be at least 0.3 mm, at least 0.5 mm, or at least 1.0 mm greater than the surface height hs, such as from 0.3 mm to 6 mm, from 0.5 mm to 6 mm, or from 1.0 mm to 6 mm greater than the surface height hs. As indicated in FIG. 8, the corresponding curved line 210a of the sipe 21 comprises a sharp inner corner 220a, when the curved line 210a is defined for a depth of at most the first transition depth d1.

Referring to FIGS. 7a and 7b, at a certain height, greater than a second transition height h2, the curved line 110 may comprise such bends which form rounded corners 720b, 820b. The radius of curvature of the rounded corners may be at least 0.3 mm, preferably at least 0.5 mm. This has the effect that at the bottom of a corresponding sipe, the corresponding sipe is has at least some rounded corners, which are less vulnerable to tearing. In an embodiment, at a height greater than a second transition height h2, the curved line 110 comprises only such bends which form rounded corners 720b, 820b. As indicated in FIG. 8, the corresponding curved line 210b of the sipe 21 only comprises rounded corners when the curved line 210b is defined for a depth of at least the second transition depth d2.

One of the effects brought by this configuration is to improve tear resistance of the sipes 21. This improves the reliability of the tire, in particular the reliability of the sipes 21, because the tearing stresses acting on the tread near sipes have less locations to concentrate in. Should the sipes have sharp corners also at the bottom, tearing stress would concentrate precisely on the sharp corners, and could tear off the sipes. The second transition depth d2 is greater than or equal to the first transition depth d1.

Correspondingly, the first sipe 21 of a tyre is arranged such that at all depths from a second transition depth d2 to the bottom of the first sipe 21, the curved line 210 (i.e. 210b) only comprises such bending points that have an inner rounded corner, of which radius of curvature is at least 0.3 mm, preferably at least 0.5 mm. Moreover, in an embodiment the second transition depth d2 is greater than the first transition depth d1. In an embodiment, the second transition depth d2 is at least 0.5 mm, at least 0.7 mm, or at least 1.0 mm greater than the first transition depth d1. Having a reasonable large difference in between the transition depths (d1, d2) improves the tear resistance also in between the transition depths.

The tear resistance is also somewhat better, if the first sipe 21 is shaped in such a way, that at all depths from a second transition depth d2 to the bottom of the first sipe 21, the curved line 210 comprises such a bending point 22b that has an inner rounded corner 220b, of which radius of curvature is at least 0.3 mm, preferably at least 0.5 mm.

In an embodiment, all the corners of curved line (curved line 110 of the lamella plate or curved line 210 of the sipe) are formed such that the angle of each inner corner is less than 90, less than 85, or less than 75. This further improves the grip, since such acute lamellas have been observed to improve the grip. Until now, such sipes and lamella plates have not been manufactured, since such structures are hard for form by bending.

It is also noted that even if a pneumatic tyre is, at least soon after vulcanization, elastic and soft, after aging e.g. for several months, the material of the tyre becomes harder and more brittle. Thus, the rounding of the corners at the bottom of the sipe takes also into account the long term reliability problems related to aging of material. In addition, in typical use, the sharp corners at the top of the sipe may wear off in typically use before the material becomes hard.

In an embodiment, the lamella plate and/or the sipe is formed in such a way that the width of the lamella plate and/or the sipe is formed such that the width of the sipe is greater at the bottom than at the top (i.e. the open end of the sipe). Referring to FIG. 7b, a lamella plate may be formed such that the width W2 at the top surface 85 is greater than the width W1 of the lamella plate at the surface height hs. Referring to FIG. 8, a sipe 21 may be formed such that the width W2 at the bottom of the sipe is greater than the width W1 of the sipe at the top.

In such a structure, as the tyre wears, the sipes 21 become wider. Thus, the lamellas 23 in between the sipes 21 can deform more before the lamella 23 makes a contact with an adjacent lamella 23. In this way, as the tyre wears, the siped tread blocks become, in effect, softer. At the same time, however, the material of the tyre hardens due to aging. In effect, such a shape of a sipe ensures that the tyre properties remain reasonably constant in use, even if the tyre wears and the material thereof ages. This is particularly beneficial, when a sipe comprises a sharp edge as discussed above.

The width W2 at the bottom of the sipe 21 (or top of lamella plate) may be e.g. at least 20% greater or at least 30% greater than the width W1 at the top of the sipe 21 (or at the surface height hs of the lamella plate). For example, W1 may be from 0.1 mm to 2 mm, while W2 may be from 0.5 mm to 3 mm.

It is also possible to form the sipe and/or the lamella plate in such a way that the shape of the curved line (110 or the lamella plate and/or 210 of the sipe) changes significantly as the tyre wears.

Lamella plates according to some embodiments of the present application can be manufactured by for example by an additive manufacturing technology, such as 3D printing. In the alternative or in addition, a subtractive manufacturing technology, such as machining, can be used in the process of manufacturing a lamella plate. The technique(s) are applied in such a way that so that a corner is sharp up to the first transition height h1; and optionally so that the corners start to become more rounded only after the first transition height h1.

The sipes according to the embodiments of the present application are particularly feasible in winter tires. Such a winter tire may comprise studs 300 (see FIG. 10a), or the tire may be free from studs.

The invention claimed is:

1. A tread block for a tread of a pneumatic tire or for a tread band for a pneumatic tire, the tread block comprising:
   a plurality of sipes, at least some of the plurality of sipes each having
      an open top end to the surface of the tread block,
      a bottom located in the tread block, and
      a first side wall and a second side wall curved in the lengthwise direction of the sipe, an intersection of the sipe with a surface that is geometrically congruent and parallel with the surface of the tread block and arranged a depth apart from the surface of the tread block into the tread block forming a curved line,
   wherein at least a first sipe of the plurality of sipes is shaped such that, at all depths within a range from the open top end of the first sipe to a first transition depth of at least 0.3 mm, the curved line comprises at least one deflection point having an inner corner that has a radius of curvature under 0.3 mm, and
   the first sipe is shaped such that, at all depths from a second transition depth to the bottom of the first sipe, the curved line comprises a bending point that has an inner rounded corner, a radius of curvature of the inner rounded corner being at least 0.3 mm, the second transition depth being greater than the first transition depth.

2. A tread band for a tread pneumatic tire, the tread band comprising the tread block of claim 1.

3. A pneumatic tire having comprising:
   a tread configured for rolling contact against a ground surface, said tread having a cylindrical shape, the tread comprising tread blocks of claim 1.

4. The tread block according to claim 1, wherein said at least one deflection point has a deflection angle that is less than 90 degrees.

5. The tread block according to claim 4, wherein said deflection angle is less than 75 degrees.

6. The tread block according to claim 1, wherein the bottom of the first sipe has an uneven or curved surface, whereby the depth of the first sipe measured from the surface of the tread block to the bottom of the first sipe at a first primary point is different from the depth of the first sipe measured from the surface of the tread block to the bottom of the sipe at a second primary point.

7. The tread block according to claim 6, wherein the depth of the first sipe at the first primary point is less than the depth of the first sipe at the second primary point and the second primary point is located closer to a center of the first sipe than the first primary point.

8. The tread block according to claim 1, wherein the first side wall comprises a projection or a recession and the second side wall comprises a geometrically congruent recession or projection, respectively, whereby the first and second side walls form a locking element configured to lock the first and second side walls to each other.

9. The tread block according to claim 8, wherein the first side wall and the second side wall comprise at least two planes which form an angle with each other in the depthwise direction of the first sipe such that the intersection of the planes extends in a direction that forms an angle of at least 15 degrees with the normal of the surface of the tread block.

10. The tread block according to claim 1, wherein the first side wall and the second side wall are configured such that, for a given depth
   at a first secondary point, the curved line propagates in a first direction, the first secondary point defining a first tangential plane including the first secondary point, the first direction, and a direction of a sidewall of the first sipe, the direction of the sidewall being perpendicular to the first direction,
   at a second secondary point, the curved line propagates in a second direction that is parallel to the first direction or forms an angle of at most 30 degrees with the first direction, the second secondary point defining a second tangential plane including second secondary point, the second direction and a direction of a sidewall of the first sipe, the direction of the sidewall being perpendicular to the second direction, and
   the first or the second side wall comprises a protrusion in between the first secondary point and the second secondary point, the protrusion protruding to the same direction from the first tangential plane and the second tangential plane.

11. The tread block according claim 10, wherein
   the curved line comprises at least three deflection points in between the first secondary point and the second secondary point.

12. The tread block according to claim 1, wherein the inner corner of the deflection point has a radius of curvature under 0.25 mm.

13. The tread block according to claim 1, wherein said first transition depth is from 0.3 mm to 6 mm.

14. The tread block according to claim 1, wherein radius of curvature is at least 0.5 mm.

15. A lamella plate suitable for manufacturing a pneumatic tire, a tread band, or a tread block, the lamella plate being configured to form a sipe in the tread block of the pneumatic tire or the tread band, the lamella plate comprising:
   a bottom surface;
   a top surface located apart from the bottom surface in a direction of height of the lamella plate; and
   a first side wall and a second side wall curved in a lengthwise direction of the lamella plate, the lengthwise direction being perpendicular to the height and a cross-section of the lamella plate with a plane that has a surface normal that is parallel to the height of the lamella plate and is disposed at a height from the bottom surface forming a curved line,
   wherein, at all heights within a range from a surface height to a first transition height of at least 0.3 mm, as measured from the bottom surface of the lamella plate, the curved line comprises at least one deflection point having an inner corner that has a radius of curvature under 0.3 mm, and
   at all heights from a second transition height to the bottom surface of the lamella plate, the curved line comprises a bending point that has an inner rounded corner, a radius of curvature of the inner rounded corner being at least 0.3 mm, the second transition height being greater than the first transition height.

16. The lamella plate according to claim 15, wherein the lamella plate comprises metal.

17. The lamella plate according to claim 15, wherein
   the height of the lamella plate is at least 4 mm, and
   the first transition height is at least 0.3 mm greater than the surface height.

* * * * *